US012725436B2

(12) United States Patent
Bang

(10) Patent No.: US 12,725,436 B2
(45) Date of Patent: Sep. 1, 2026

(54) METHOD FOR IMPROVING SEMANTIC SEGMENTATION ACCURACY AT BOUNDARY REGIONS

(71) Applicant: AIVEX Co., Ltd., Suji-gu (KR)

(72) Inventor: Seongdeok Bang, Seoul (KR)

(73) Assignee: AIVEX Co., Ltd., Yongin-si (KR)

( * ) Notice: Subject to any disclaimer, the term of this patent is extended or adjusted under 35 U.S.C. 154(b) by 0 days.

(21) Appl. No.: 19/203,109

(22) Filed: May 8, 2025

(65) Prior Publication Data

US 2026/0087837 A1 Mar. 26, 2026

(30) Foreign Application Priority Data

May 9, 2024 (KR) ........................ 10-2024-0061220

(51) Int. Cl.
*G06V 20/70* (2022.01)
*G06V 10/82* (2022.01)

(52) U.S. Cl.
CPC .............. *G06V 20/70* (2022.01); *G06V 10/82* (2022.01)

(58) Field of Classification Search
CPC ........... G06V 10/82; G06V 20/70; G06N 3/08
See application file for complete search history.

(56) References Cited

U.S. PATENT DOCUMENTS 9,607,224 B2 3/2017 Tsai et al.
9,972,092 B2 * 5/2018 Lin .......................... G06T 7/11
11,461,998 B2 10/2022 Liu et al.
11,756,667 B2 9/2023 Lou et al.
2021/0089807 A1 3/2021 Liu et al.
2021/0272288 A1 9/2021 Takahashi et al.
2021/0334975 A1 10/2021 Yang et al.
2022/0156528 A1 * 5/2022 Borse ....................... G06N 3/09
2022/0366679 A1 11/2022 Li et al.

FOREIGN PATENT DOCUMENTS

CN 114781489 A 7/2022
EP 3644275 A1 4/2020
EP 3726465 A1 10/2020
(Continued)

OTHER PUBLICATIONS

Marmanis, et al. (Classification with an edge: Improving semantic image segmentation with boundary detection). (Year: 2017).*
(Continued)

*Primary Examiner* — Daniel G Mariam
(74) *Attorney, Agent, or Firm* — Jodi A. Reynolds; Harter Secrest & Emery LLP

(57) ABSTRACT

Disclosed is a method for performing object segmentation using a neural network model, the method performed by one or more processors of a computing device according to an exemplary embodiment of the present disclosure.
the method may include: obtaining a training image containing an object; training a neural network model to perform object segmentation using the training image; identifying a boundary region of the object included in the training image; obtaining an additional training image based on the training image and the identified boundary region; and additionally training the trained neural network model based on the additional training image.

15 Claims, 7 Drawing Sheets

(56) References Cited

FOREIGN PATENT DOCUMENTS

| | | | |
|---|---|---|---|
| KR | 1020210008051 | A | 1/2021 |
| KR | 1020210036244 | A | 4/2021 |
| KR | 1020210144294 | A | 11/2021 |

OTHER PUBLICATIONS

Smith (Cyclical Learning Rates for Training Neural Networks). (Year: 2017).*

European Patent Office, Extended European Search Report for corresponding EP Application No. 25175030.3-1218, dated Sep. 25, 2025.

Bowen Cheng et al., Boundary IoU: Improving Object-Centric Image Segmentation Evaluation, arXiv:2103.16562v1 (Mar. 30, 2021.).

Chengyuan Zhuang et al., Boundary Enhancement Network for Improvement Semantic Segmentation, ICUIA 2020 (Dec. 19, 2020.).

* cited by examiner

METHOD FOR IMPROVING SEMANTIC SEGMENTATION ACCURACY AT BOUNDARY REGIONS

CROSS-REFERENCE TO RELATED APPLICATIONS

This application claims priority to and the benefit of Korean Patent Application No. 10-2024-0061220 filed in the Korean Intellectual Property Office on May 9, 2024, the entire contents of which are incorporated herein by reference.

TECHNICAL FIELD

The present disclosure relates a method for improving semantic segmentation accuracy at boundary regions, and more particularly, to a method for improving semantic segmentation accuracy at boundary regions by identifying a boundary region of an object included in a training image, obtaining an additional training image based on the specific boundary region, and training a neural network model by using the obtained additional training image.

BACKGROUND ART

Conventional measurement using computer vision deep learning has a technical goal of minimizing pixel-level errors and recognizing boundary lines between objects very accurately in semantic segmentation.

However, since an overlapping portion between two sets of a training image and a prediction image is measured when a method such as a dice coefficient loss, an IOU, or the like, which is often used in the conventional measurement using computer vision deep learning, is used, there is a problem in that a score is set at a very high level even if a number of pixels of a boundary line are not accurately predicted.

Therefore, there is a need for a method capable of improving semantic segmentation accuracy at the boundary region while utilizing a conventional method in measurement using deep learning.

On the other hand, the present disclosure has been derived at least based on the technical background described above, but the technical problem or object of the present disclosure is not limited to solving the problems or disadvantages described above. That is, the present disclosure may cover various technical issues related to the content to be described below, in addition to the technical issues discussed above.

SUMMARY OF THE INVENTION

The present disclosure has been made in an effort to provide a method for improving semantic segmentation accuracy at boundary regions, and more particularly, a method for improving semantic segmentation accuracy at boundary regions by identifying a boundary region of an object included in a training image, obtaining an additional training image based on the specific boundary region, and training a neural network model by using the obtained additional training image.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method performed by a computing device. The method may include: obtaining a training image containing an object; training a neural network model to perform object segmentation using the training image; identifying a boundary region of the object included in the training image; obtaining an additional training image based on the training image and the identified boundary region; and additionally training the trained neural network model based on the additional training image;

Alternatively, the training a neural network model to perform object segmentation using the training image includes: obtaining a predefined learning rate for the neural network model; and training the neural network model to perform object segmentation using the training image based on the predefined learning rate.

Alternatively, the training the neural network model for object segmentation using the training image based on the predefined learning rate includes: finishing training when a learning rate of the neural network model reaches the predefined learning rate.

Alternatively, the training a neural network model for object segmentation using the training image includes: training the neural network model for object segmentation using the training image based on at least one of a cross-entropy loss or a dice coefficient loss.

Alternatively, the identifying the boundary region of the object included in the training image includes: identifying the boundary region of the object included in the training image based on a predefined size with reference to a contour of the object.

Alternatively, the identifying the boundary region of the object included in the training image includes: identifying the boundary region of the object included in the training image based on a distance from the center of the object to boundary of the object.

Alternatively, the obtaining the additional training image based on the training image and the identified boundary region includes: obtaining the additional training image by setting a separate weight to the identified boundary region of the training image.

Alternatively, the obtaining the additional training image by setting the separate weight to the identified boundary region of the training image includes: setting a second weight for the identified boundary region of the additional training image higher than a first weight for an internal region of the object included in the additional training image.

Alternatively, the additionally training the trained neural network model based on the additional training image includes: additionally training the trained neural network model based on the additional training image with the set weight.

Alternatively, the additionally training the trained neural network model based on the additional training image includes: additionally training the trained neural network model based on the additional training image using a boundary IOU(Intersection over Union).

Another exemplary embodiment of the present disclosure provides a computer program stored in a non-transitory computer readable medium. The computer program may cause one or more processors to perform operations for predicting a volume of an object when the computer program is executed by the one or more processors, and the operations may include: an operation of obtaining a training image containing an object; an operation of training a neural network model to perform object segmentation using the training image; an operation of identifying a boundary region of the object included in the training image; an operation of obtaining an additional training image based on the training image and the identified boundary region; and an operation of additionally training the trained neural network model based on the additional training image.

Alternatively, the operation of training a neural network model to perform object segmentation using the training image includes: an operation of obtaining a predefined learning rate for the neural network model; and an operation of Training the neural network model to perform object segmentation using the training image based on the predefined learning rate.

Alternatively, the operation of training the neural network model for object segmentation using the training image based on the predefined learning rate includes: an operation of finishing training when a learning rate of the neural network model reaches the predefined learning rate.

Alternatively, the operation of the training a neural network model for object segmentation using the training image includes: an operation of training the neural network model for object segmentation using the training image based on at least one of a cross-entropy loss or a dice coefficient loss.

Alternatively, the operation of identifying the boundary region of the object included in the training image includes: an operation of identifying the boundary region of the object included in the training image based on a predefined size with reference to a contour of the object.

Alternatively, the operation of identifying the boundary region of the object included in the training image includes: an operation of identifying the boundary region of the object included in the training image based on a distance from the center of the object to boundary of the object.

Alternatively, the operation of obtaining the additional training image based on the training image and the identified boundary region includes: an operation of obtaining the additional training image by setting a separate weight to the identified boundary region of the training image.

Alternatively, the operation of obtaining the additional training image by setting the separate weight to the identified boundary region of the training image includes: an operation of setting a second weight for the identified boundary region of the additional training image higher than a first weight for an internal region of the object included in the additional training image.

Alternatively, the operation of additionally training the trained neural network model based on the additional training image includes: an operation of additionally training the trained neural network model based on the additional training image with the set weight.

Alternatively, the operation of additionally training the trained neural network model based on the additional training image includes: an operation of additionally training the trained neural network model based on the additional training image using a boundary IOU (Intersection over Union).

Yet another exemplary embodiment of the present disclosure provides a computing device. The device may include: at least one processor; and a memory, and the at least one processor may be configured to: obtain a training image containing an object; train a neural network model to perform object segmentation using the training image; identify a boundary region of the object included in the training image; obtain an additional training image based on the training image and the identified boundary region; and additional train the trained neural network model based on the additional training image.

Still yet another exemplary embodiment of the present disclosure provides a data structure included in a computer-readable storage medium. The data structure may correspond to a parameter of a neural network, and the neural network may perform the following steps at least partially based on the parameter, and the steps may include: at least method may include: obtaining a training image containing an object; training a neural network model to perform object segmentation using the training image; identifying a boundary region of the object included in the training image; obtaining an additional training image based on the training image and the identified boundary region; and additionally training the trained neural network model based on the additional training image.

The present disclosure relates a method for improving semantic segmentation accuracy at boundary regions, and more particularly, the method can improve semantic segmentation accuracy at boundary regions by identifying a boundary region of an object included in a training image, obtaining an additional training image based on the specific boundary region, and training a neural network model by using the obtained additional training image.

Meanwhile, the effects of the present disclosure are not limited to the above-mentioned effects, and various effects can be included within the scope which is apparent to those skilled in the art from contents to be described below.

DETAILED DESCRIPTION

Figure 1:
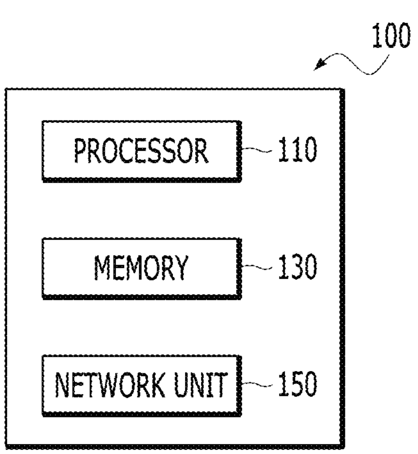
FIG. 1 is a block diagram of a computing device for improving semantic segmentation accuracy at boundary regions according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for improving semantic segmentation accuracy at boundary regions according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for training the neural network. The processor 110 may perform calculations for training the neural network, which include processing of input data for training in deep learning (DL), extracting a feature in the input data, calculating an error, updating a weight of the neural network using backpropagation, and the like. At least one of the CPU, GPGPU, and TPU of the processor 110 may process training of a network function. For example, both the CPU and the GPGPU may process the training of the network function and data classification using the network function. Further, in an exemplary embodiment of the present disclosure, processors of a plurality of computing devices may be used together to process the training of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network unit 150 presented in the present disclosure may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

Figure 2:
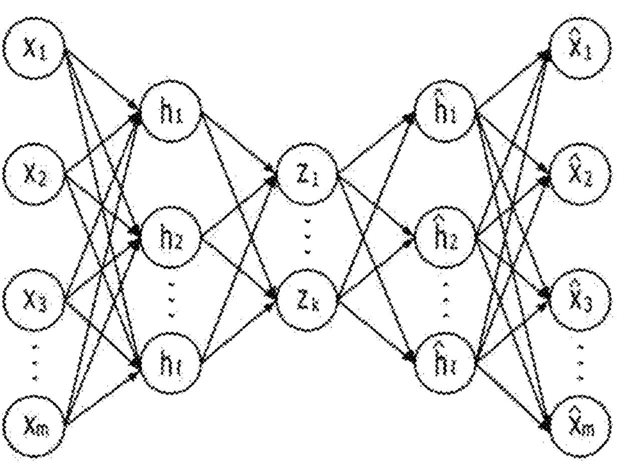
FIG. 2 is a schematic diagram illustrating a network function according to an exemplary embodiment of the present disclosure.

FIG. 2 is a conceptual view illustrating a neural network according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be trained in at least one scheme of supervised learning, unsupervised learning, semi supervised learning, or reinforcement learning. The learning of the neural network may be a process in which the neural network applies knowledge for performing a specific operation to the neural network.

The neural network may be trained in a direction to minimize errors of an output. The training of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a training cycle (epoch). The learning rate may be applied differently according to the number of repetition times of the training cycle of the neural network. For example, in an initial stage of the training of the neural network, the neural network ensures a certain level of performance quickly by using a high learning rate, thereby increasing efficiency and uses a low learning rate in a latter stage of the training, thereby increasing accuracy.

In training of the neural network, the training data may be generally a subset of actual data (i.e., data to be processed using the trained neural network), and as a result, there may be a training cycle in which errors for the training data decrease, but the errors for the actual data increase. Overfitting is a phenomenon in which the errors for the actual data increase due to excessive training of the training data. For example, a phenomenon in which the neural network that trains a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of training, utilization of a batch normalization layer, etc., may be applied.

Figure 3:
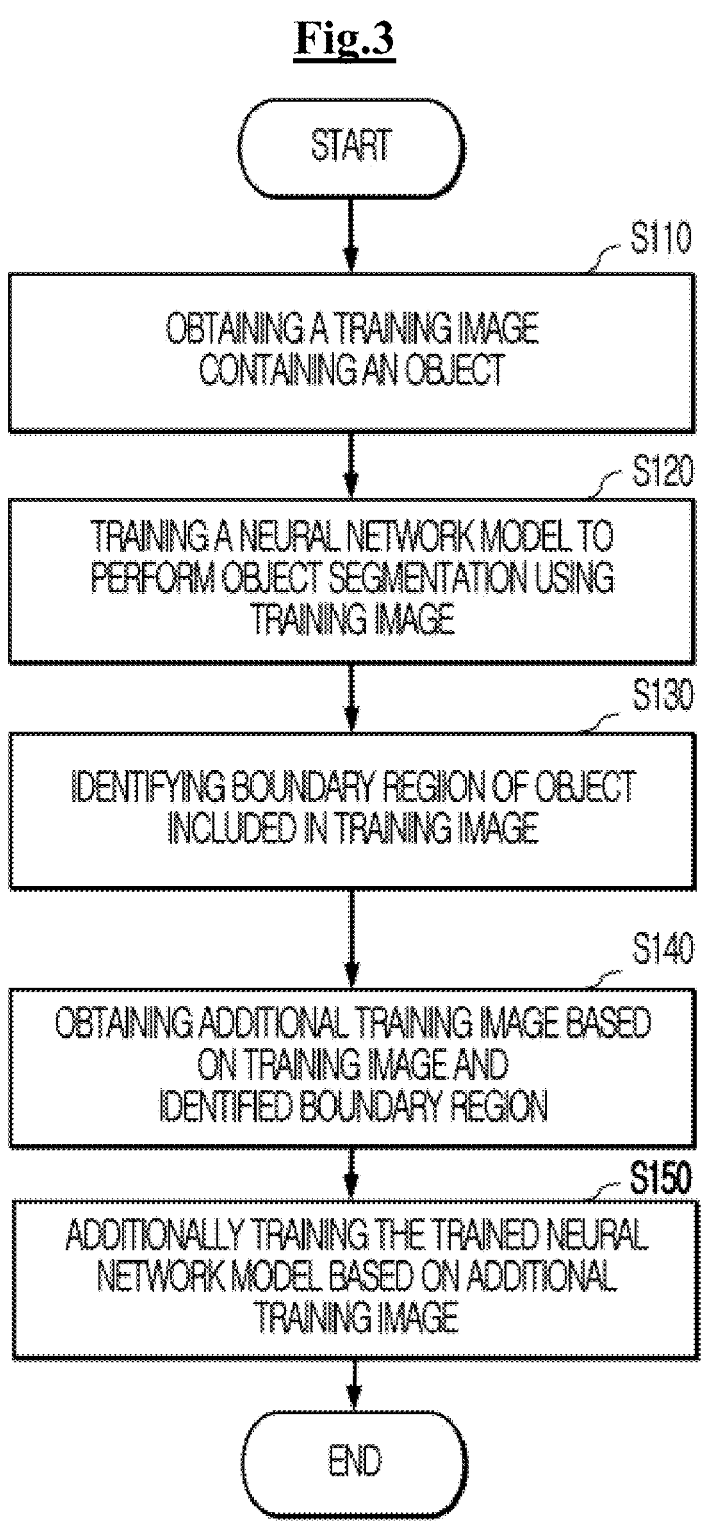
FIG. 3 is a flowchart of a method for improving semantic segmentation accuracy at boundary regions according to an exemplary embodiment of the present disclosure.

FIG. 3 is a flowchart of a method for improving semantic segmentation accuracy at boundary regions according to an exemplary embodiment of the present disclosure.

A computing device 100 according to an exemplary embodiment of the present disclosure may directly obtain or receive, from an external system, "information for performing object segmentation by using a neural network model". The external system may be a server, database or the like that stores and manages the information for performing the object segmentation by using the neural network model. The computing device 100 may use the information obtained directly or received from the external system as "input data for performing the object segmentation by using the neural network model".

According to an exemplary embodiment of the present disclosure, the computing device 100 may obtain a training image including an object (S110). In this case, the object included in the training image may refer to an object to be subjected to object segmentation, and examples thereof may illustratively include, but are not limited to, a box, a product, and the like in a manufacturing process. Further, the training image may include an image in which the object is captured to be included and an image in which a region of the object is labeled. Meanwhile, the obtained training image may be used in a process of training the neural network model for performing the object segmentation, which will be described below.

According to an exemplary embodiment of the present disclosure, the computing device 100 may train the neural network model for performing the object segmentation by using the training image obtained through step S110 (S120). For example, the computing device 100 may obtain a predefined training rate for the neural network model, and train, based on the predefined training rate, the neural network model for performing the object segmentation by using the training image. Further, the computing device 100 may stop training when the training rate of the neural network model reaches the predefined training rate. As a specific example, the computing device 100 may set a predefined training rate for the neural network model for performing the object segmentation to be 99%, and thus may stop training when the training rate of the neural network model reaches the predefined training rate of 99%. In this case, as the predefined training rate, in addition to 99%, various examples may be used, but examples thereof are not limited thereto. In addition, the computing device 100 may train, based on at least one of a cross entropy loss and a dice coefficient loss, the neural network model for performing the object segmentation by utilizing the training image, and DeepLabv3+SETR, DETR, or the like may be illustratively utilized as the neural network model for performing the object segmentation, but examples thereof are not limited thereto. Meanwhile, a process of training, by the computing device 100, the neural network model for performing the object segmentation by using the obtained training image will be described below in detail with reference to FIG. 4.

According to an exemplary embodiment of the present disclosure, the computing device 100 may identify a boundary region of the object included in the training image obtained through step S110 (S130). According to an example, the computing device 100 may identify the boundary region of the object based on a predefined size based on a contour of the object included in the training image. For example, the computing device 100 may identify, based on a contour of the object region included in the training image, the region as a boundary region of the object based on a predefined size of 10 pixels. However, as the predefined size, various examples may be used in addition to 10 pixels. As another example, the computing device 100 may identify the boundary region of the object based on a distance up to a boundary of the object from a center of the object included in the training image. Specifically, the computing device 100 may set a horizontal axis and a vertical axis with respect to the center of the object when the object has a rectangular shape, may identify the boundary region of the object based on a distance between the set horizontal axis and an inner boundary or a contour of the object, and may identify the boundary region of the object based on the distance between the set vertical axis and the inner boundary or the contour of the object. Meanwhile, a specific description for the process of identifying the object region of the object included in the training image by the computing device 10 through the exemplary embodiment of the present disclosure will be described below through FIGS. 5A and 5B below.

According to an exemplary embodiment of the present disclosure, the computing device 100 may obtain an additional training image based on the training image obtained through step S110 and the boundary region identified through step S130 (S140). For example, the computing device 100 may set a separate weight for the identified boundary region of the training image to obtain the additional training image. Specifically, the computing device 100 may set a second weight for the identified boundary region of the additional training image to be higher than a first weight of an intra-object region included in the additional training image, and exemplarily, the computing device 110 may set the first weight for the intra-object region included in the additional training image to 1, and set the second weights for the identified boundary region of the additional training image to 2. However, a value of the set first or second weight is not limited to 1 or 2, and various exemplary embodiments applicable to those skilled in the art may be applied. Further, the computing device 100 may train the neural network model trained through the above-described exemplary embodiment through the additional training image, and specific descriptions related thereto will be described below.

According to an exemplary embodiment of the present disclosure, the computing device 100 may additionally train the neural network model trained through step S120 based on the additional training image obtained through step S140 (S150). Specifically, the computing device 100 may additionally train the trained neural network model based on the additional training image for which the weight is set. For example, the computing device 100 may utilize a boundary intersection over union (IOU) to additionally train the trained neural network model based on the additional training image. Additionally the computing device 100 may utilize the additional training image as a validation metric for the additionally trained neural network model. In this regard, the computing device 100 may additionally train the trained neural network model based on the additional training image for which the weight is set, so as to solve a problem in that a score is set at a very high level even if a number of pixels of a boundary line are not accurately predicted due to the measurement of a simple overlapping portion between two sets of the training image and the prediction image, and obtain a technical effect of improving semantic segmentation accuracy of the boundary region. Meanwhile, a specific process in which the computing device 100 additionally trains the neural network model trained based on the additional training image will be described below with reference to FIG. 6.

Figure 4:
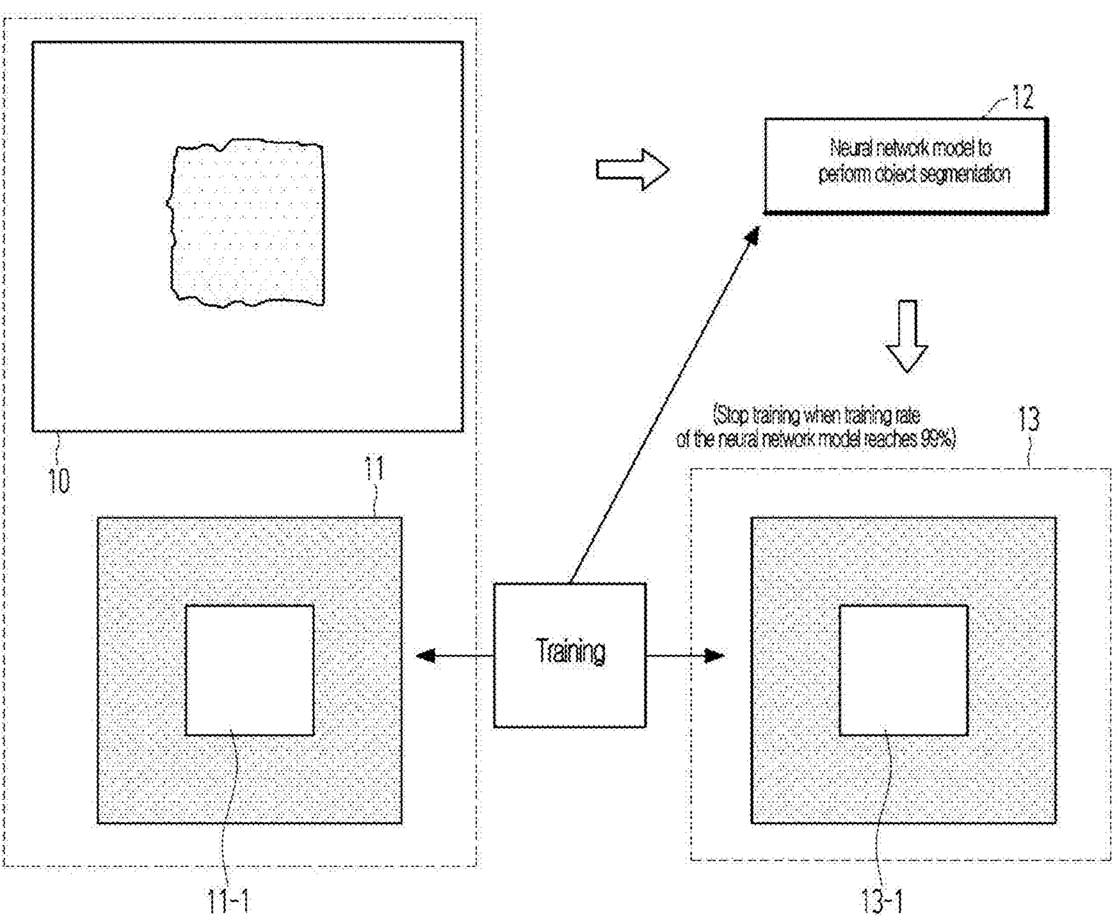
FIG. 4 is a schematic diagram for describing a process of training a neural network model for performing object segmentation by utilizing a training image according to an exemplary embodiment of the present disclosure.

FIG. 4 is a schematic diagram for describing a process of training a neural network model for performing object segmentation by utilizing a training image according to an exemplary embodiment of the present disclosure.

Referring to FIG. 4, the computing device 100 may obtain training images 10 and 11 including objects. In this case, the object included in the training image 10 may refer to an object to be subjected to object segmentation, and examples thereof may illustratively include, but are not limited to, a box, a product, and the like in a manufacturing process. Further, the training images 10 and 11 may include an image 10 in which the object is captured to be included and an image 11 in which a region of the object is labeled. Meanwhile, the obtained training images 10 and 11 may be used in a process of training a neural network model 12 for performing the object segmentation, which will be described below.

Thereafter, the computing device 100 may utilize the obtained training images 10 and 11 to train the neural network model 12 for performing object segmentation. Specifically, the computing device 100 may input the image 10 captured to include the object into the neural network model 12, and output a region 13-1 determined as the object as a prediction. In addition, the computing device 100 may compare the region 13-1 determined to be the predicted object with a correct answer 11-1 included in the image 11 labeled with the region of the object to calculate a loss function, and train the neural network model 12 for performing the object segmentation to minimize the loss function. In this case, the computing device 100 may train, based on at least one of a cross entropy loss and a dice coefficient loss, the neural network model for performing the object segmentation by utilizing the training image, and DeepLabv3+SETR, DETR, or the like may be illustratively used as the neural network model for performing the object segmentation, but examples thereof are not limited thereto. Meanwhile, the computing device 100 may obtain a predefined training rate for the neural network model 12, and based on the predefined training rate, train the neural network model 12 by utilizing the training images 10 and 11, and stop training when the training rate of the neural network model 12 reaches the predefined training rate. For example, the computing device 100 may set a predefined training rate for the neural network model 12 for performing the object segmentation to be 99%, and thus may stop training when the training rate of the neural network model 12 reaches the predefined training rate of 99%. Through this, the computing device 100 may first train the neural network model 12 to predict an overall region of an object before additionally training the neural network model 12 to accurately distinguish boundaries of the object, thereby increasing efficiency of additional training, which will be described below. In this case, as the predefined training rate, in addition to 99%, various examples may be used, but examples thereof are not limited thereto. Meanwhile, the computing device 100 may obtain additional training images based on the training images 10 and 11, which will be described in detail below with reference to FIGS. 5A and 5B.

Figure 5A:
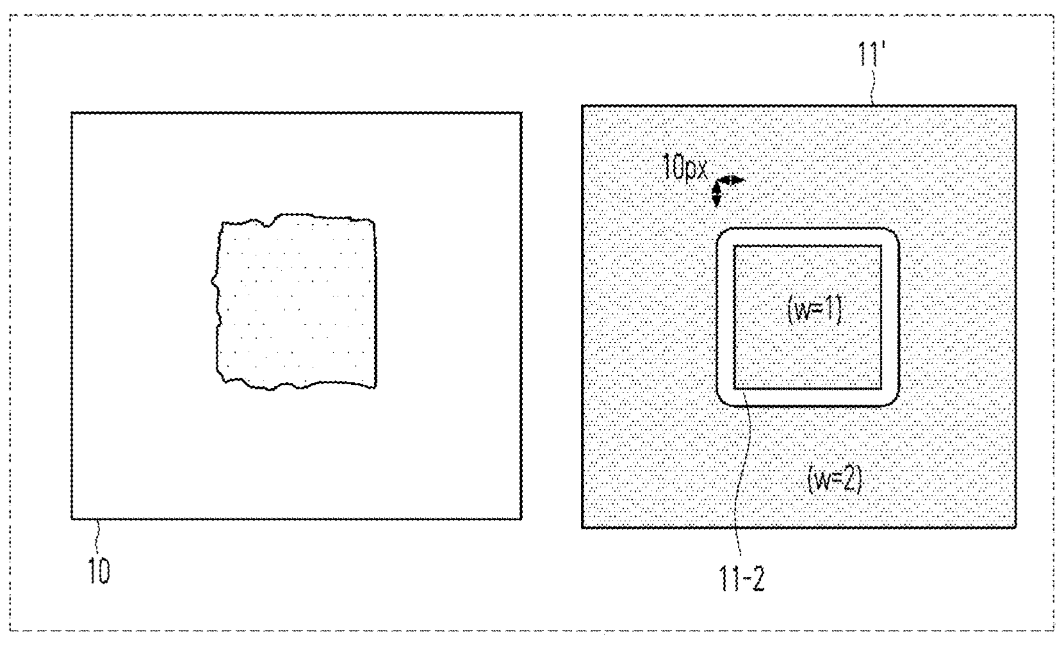
FIGS. 5A and 5B are schematic diagrams for describing a process of obtaining an additional training image based on a training image and an identified boundary region according to an exemplary embodiment of the present disclosure.
Figure 5B:
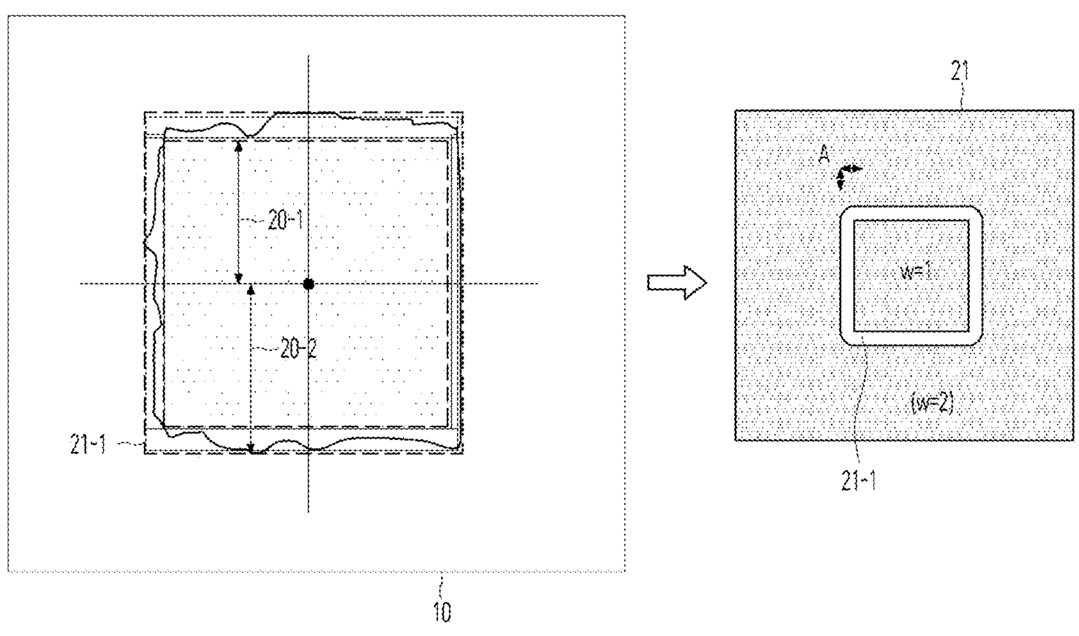

FIGS. 5A and 5B are schematic diagrams for describing a process of obtaining an additional training image based on a training image and an identified boundary region according to an embodiment of the present disclosure.

First, referring to FIG. 5A, the computing device 100 may identify, based on a predefined size based on a contour of an object included in each of the training images 10 and 11, a boundary region 11-2 of the object. In this regard, when the object is a rectangular mobile phone, the object may have a rectangular shape, but in reality, the boundary may have a bumpy shape rather than a perfectly straight line. Therefore, in order to accurately distinguish the boundary of the object, the computing device 100 needs a process of identifying the boundary region of the object in addition to distinguishing the overall region of the object, and obtaining the additional training image so that the boundary of the region may be more accurately distinguished. For example, the computing device 100 may identify, based on a contour of the object region included in the training image 11, the region as the boundary region 11-2 of the object based on a predefined size of 10 pixels. However, as the predefined size, various examples may be used in addition to 10 pixels.

As another example, referring to FIG. 5B, the computing device 100 may identify, based on a distance up to a boundary 20-1 or 20-2 of an object based on a center of the object included in each of the training images 10 and 11, a boundary region 21-1 of the object. Specifically, the computing device 100 may set a horizontal axis and a vertical axis with respect to the center of the object when the object has a rectangular shape, may identify the boundary region of the object based on a distance between the set horizontal axis and an inner boundary or a contour of the object, and may identify the boundary region of the object based on the distance between the set vertical axis and the inner boundary or the contour of the object. For example, the computing device 100 may measure a shortest distance 20-1 from a horizontal axis relative to the center of the object to an inner boundary of the object, and may measure a longest distance 20-2 from the horizontal axis relative to the center of the object, to a contour of the object. Similarly, the computing device 100 may also identify a size (illustratively, A px) of a boundary region of the object based on "a longest distance 20-2 from a horizontal axis to a contour of the object"—"a shortest distance 20-1 from the horizontal axis to an inner boundary of the object," and "a longest distance from a vertical axis to the contour of the object"—"a shortest distance from the vertical axis to the inner boundary of the object," to obtain the boundary region 21-1 of the object. Meanwhile, in addition to the rectangular object in the example of FIG. 5B, when the object is circular, the computing device 100 may obtain the boundary region 21-1 of the object by identifying the size of the boundary region of the object through a shortest distance from the center to the circle inscribed in the object, a longest distance to the circle circumscribing the object, and the like, and various examples may be utilized. Through this, the computing device 100 may identify a region in which the boundary of the object needs to be accurately distinguished, and the identified boundary region of the object may be utilized in a process of obtaining an additional training image, which will be described below.

Further, the computing device 100 may obtain an additional training image 11' or 21 based on the training images 10 and 11 and the boundary region 11-2 or 21-1 identified via the exemplary embodiments of FIGS. 5A and 5B. For example, the computing device 100 may obtain the additional training image 11' or 21 by setting a separate weight for the training images 10 and 11 and the identified boundary region 11-2 or 21-1. Specifically, the computing device 100 may set a second weight for the identified boundary region 11-2 or 21-1 of the additional training image 11' or 21 to be higher than a first weight of an intra-object region included in the additional training image 11' or 21, and exemplarily, the computing device 100 may set the first weight for the intra-object region included in the additional training image 11' or 21 to 1, and set the second weight for the identified boundary region 11-2 or 21-1 of the additional training image 11' or 21 to 2. However, a value of the set first or second weight is not limited to 1 or 2, and various exemplary embodiments applicable to those skilled in the art may be applied. Meanwhile, the computing device 100 may train the neural network model trained through the above-described exemplary embodiment of FIG. 4 through the additional training image 11' or 21, and specific descriptions related thereto will be described below through FIG. 6. Meanwhile, expressions such as first, second, etc., disclosed throughout the present disclosure are just a meaning for distinguishing components, and the present disclosure is not limited thereto.

Figure 6:
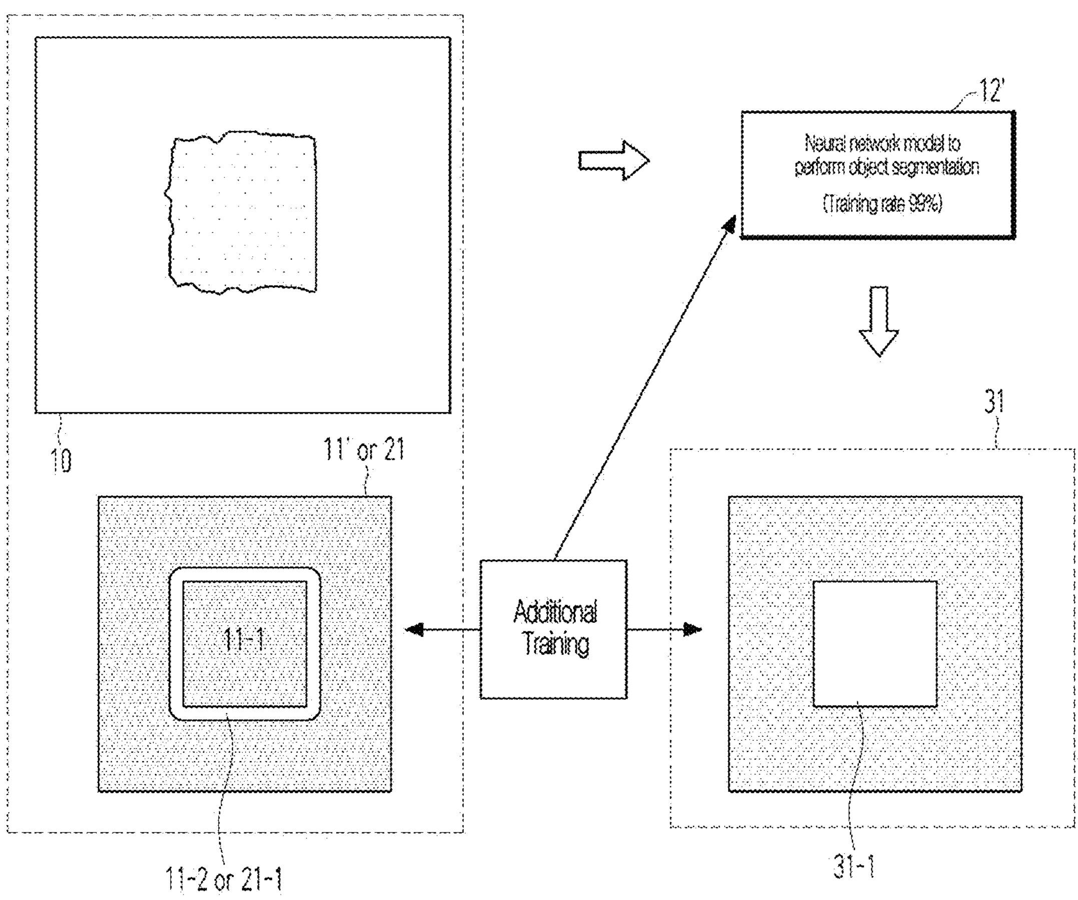
FIG. 6 is a schematic diagram for describing a process of additionally training the neural network model trained based on the additional training image according to an exemplary embodiment of the present disclosure.

FIG. 6 is a schematic diagram for describing a process of additionally training the neural network model trained based on the additional training image according to an exemplary embodiment of the present disclosure.

Referring to FIG. 6, the computing device 100 may additionally train the neural network model 12' trained at the training rate of 99% based on the additional training image 11' or 21 for which the weight is set. For example, the computing device 100 may utilize a boundary intersection over union (IOU) to additionally train the trained neural network model 12' based on the additional training image 11' or 21. More specifically, the computing device 100 may input the image 10 captured to include the object into the trained neural network model 12', and output a region 31-1 determined as the object as a prediction. In addition, the computing device 100 may compare the region 31-1 determined to be the predicted object with a correct answer 11-1, 11-2, or 21-1 included in the additional training image 11' or 21 labeled with the region and boundary of the object to calculate a loss function, and additionally train the trained neural network model 12' for performing the object segmentation to minimize the loss function. In this case, in the process of calculating the loss function, the computing device 100 may additionally train the trained neural network model 12' by reflecting a fact that the second weight for the identified boundary region 11-2 or 21-1 is set to be higher than the first weight of the intra-object region 11-1 included in the additional training image 11' or 21. Additionally the computing device 100 may utilize the additional training image as a validation metric for the additionally trained neural network model to evaluate a performance of the additionally trained neural network model. Through this, the computing device 100 may additionally train the trained neural network model 12' based on the additional training image 11' or 21 for which the weight is set, so as to solve a problem in that a score is set at a very high level even if a number of pixels of a boundary line are not accurately predicted due to the measurement of a simple overlapping portion between two sets of the training image and the prediction image, and obtain a technical effect of improving semantic segmentation accuracy of the boundary region.

Disclosed is a computer readable medium storing the data structure according to an exemplary embodiment of the present disclosure.

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an availablely designed data structure, a computing device can perform operations while using the resources of the computing device to a minimum. Specifically, the computing device can increase the efficiency of operation, read, insert, delete, compare, exchange, and search through the availablely designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO—Last in First Out) in which the data is input last and output first. The queue is a data listing structure that may access data limitedly and unlike a stack, the queue may be a data structure (FIFO—First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

In the present disclosure, a network function, an artificial neural network, and a neural network may be used to be exchangeable. From here on, it will be described uniformly using neural networks.

The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for training the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include training data input in a neural network training process and/or input data input to a neural network in which training is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network training process and/or a weight in which neural network training is completed. The weight which varies in the neural network training process may include a weight at a time when a training cycle starts and/or a weight that varies during the training cycle. The weight in which the neural network training is completed may include a weight in which the training cycle is completed. Accordingly, the data structure including the weight of the neural network may include a data structure including the weight which varies in the neural network training process and/or the weight in which neural network training is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of training cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 7:
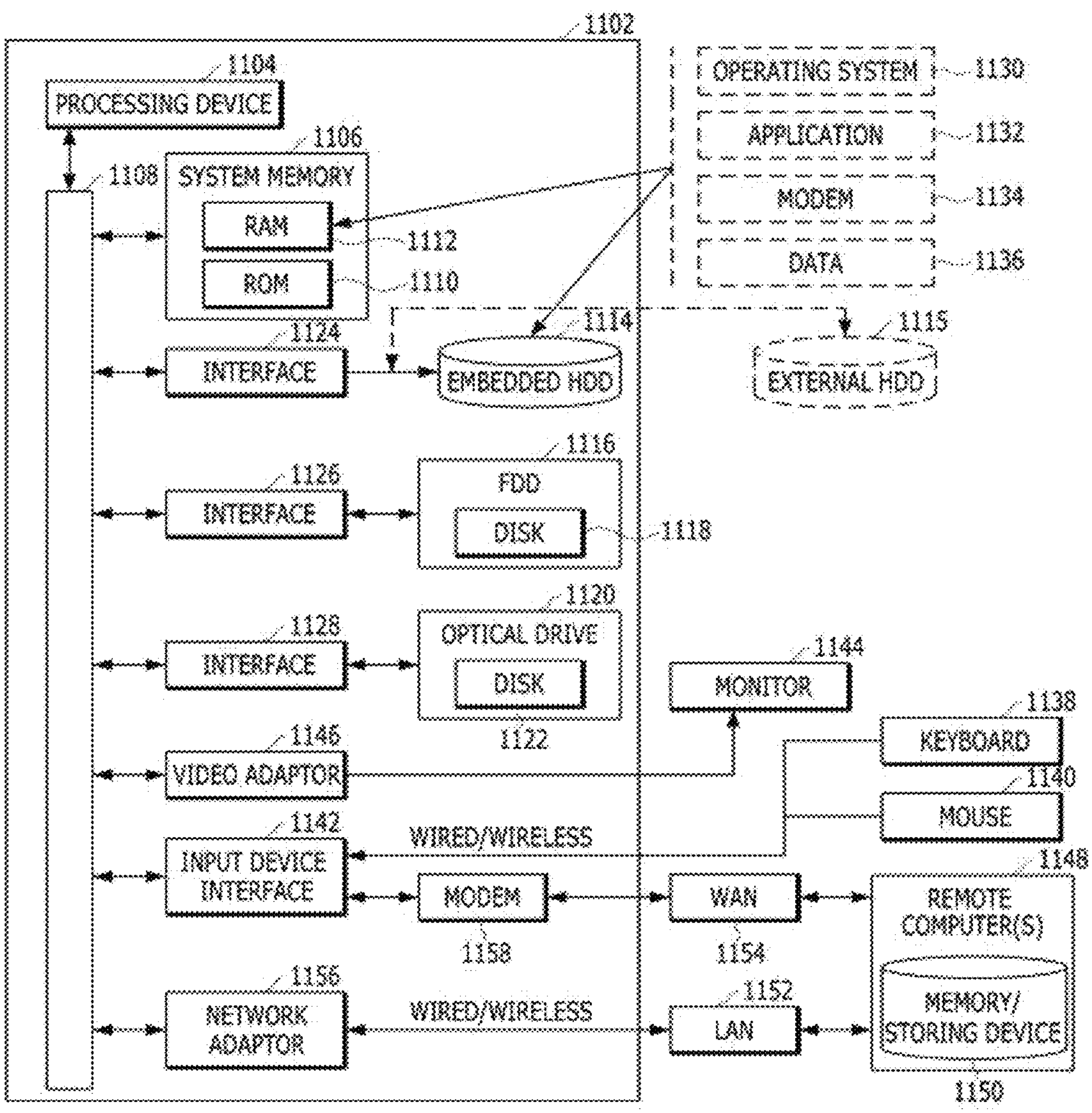
FIG. 7 is a simple and normal schematic view of an exemplary computing environment in which the exemplary embodiments of the present disclosure may be implemented.

FIG. 7 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal obtained by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure. Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer (s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A method for performing object segmentation using a neural network model, the method performed by one or more processors of a computing device, the method comprising:

obtaining a training image containing an object;

obtaining a predefined learning rate for a neural network model to perform object segmentation;

training the neural network model to perform object segmentation using the training image based on the predefined learning rate;

finishing training when a learning rate of the neural network model reaches the predefined learning rate;

identifying a boundary region of the object included in the training image;

obtaining an additional training image based on the training image and the identified boundary region; and additionally training the trained neural network model based on the additional training image, wherein the identifying the boundary region of the object included in the training image includes:

identifying the boundary region of the object included in the training image based on a shortest distance from a center of the object to an inner boundary of the object and a longest distance from the center of the object to a contour of the object.

2. The method of claim 1, wherein the training the neural network model for object segmentation using the training image includes:

training the neural network model for object segmentation using the training image based on at least one of a cross-entropy loss or a dice coefficient loss.

3. The method of claim 1, wherein the identifying the boundary region of the object included in the training image includes:

identifying the boundary region of the object included in the training image based on a predefined size with reference to the contour of the object.

4. The method of claim 1, wherein the obtaining the additional training image based on the training image and the identified boundary region includes:

obtaining the additional training image by setting a separate weight to the identified boundary region of the training image.

5. The method of claim 4, wherein the obtaining the additional training image by setting the separate weight to the identified boundary region of the training image includes:

setting a second weight for the identified boundary region of the additional training image higher than a first weight for an internal region of the object included in the additional training image.

6. The method of claim 4, wherein the additionally training the trained neural network model based on the additional training image includes:

additionally training the trained neural network model based on the additional training image with the set weight.

7. The method of claim 1, wherein the additionally training the trained neural network model based on the additional training image includes:

additionally training the trained neural network model based on the additional training image using a boundary IOU(Intersection over Union).

8. A computer program stored in a non-transitory computer-readable storage medium, wherein the computer program causes one or more processors to perform operations for performing object segmentation using a neural network model when the computer program is executed by the one or more processors, the operations comprising:

an operation of obtaining a training image containing an object;

an operation of obtaining a predefined learning rate for a neural network model to perform object segmentation;

an operation of training the neural network model to perform object segmentation using the training image based on the predefined learning rate;

an operation of finishing training when a learning rate of the neural network model reaches the predefined learning rate;

an operation of identifying a boundary region of the object included in the training image;

an operation of obtaining an additional training image based on the training image and the identified boundary region; and an operation of additionally training the trained neural network model based on the additional training image, wherein the operation of the identifying the boundary region of the object included in the training image includes:

an operation of identifying the boundary region of the object included in the training image based on a shortest distance from a center of the object to an inner boundary of the object and a longest distance from the center of the object to a contour of the object.

9. The computer program of claim 8, wherein the operation of the training the neural network model for object segmentation using the training image includes:

an operation of training the neural network model for object segmentation using the training image based on at least one of a cross-entropy loss or a dice coefficient loss.

10. The computer program of claim 8, wherein the operation of identifying the boundary region of the object included in the training image includes:

an operation of identifying the boundary region of the object included in the training image based on a predefined size with reference to the contour of the object.

11. The computer program of claim 8, wherein the operation of obtaining the additional training image based on the training image and the identified boundary region includes:

an operation of obtaining the additional training image by setting a separate weight to the identified boundary region of the training image.

12. The computer program of claim 11, wherein the operation of obtaining the additional training image by setting the separate weight to the identified boundary region of the training image includes:

an operation of setting a second weight for the identified boundary region of the additional training image higher than a first weight for an internal region of the object included in the additional training image.

13. The computer program of claim 11, wherein the operation of additionally training the trained neural network model based on the additional training image includes:

an operation of additionally training the trained neural network model based on the additional training image with the set weight.

14. The computer program of claim 8, wherein the operation of additionally training the trained neural network model based on the additional training image includes:

an operation of additionally training the trained neural network model based on the additional training image using a boundary IOU(Intersection over Union).

15. A computing device comprising:

at least one processor; and a memory, wherein the at least one processor is configured to:

obtain a training image containing an object;

obtain a predefined learning rate for a neural network model to perform object segmentation;

train the neural network model to perform object segmentation using the training image based on the predefined learning rate;

finish training when a learning rate of the neural network model reaches the predefined learning rate;

identify a boundary region of the object included in the training image;

obtain an additional training image based on the training image and the identified boundary region; and additionally train the trained neural network model based on the additional training image, and wherein the identifying the boundary region of the object included in the training image includes:

identifying the boundary region of the object included in the training image based on a shortest distance from a center of the object to an inner boundary of the object and a longest distance from the center of the object to a contour of the object.

* * * * *